United States Patent
Van Duyn

[11] Patent Number: 6,082,959
[45] Date of Patent: Jul. 4, 2000

[54] METHOD AND APPARATUS FOR SUPPORTING A ROTATABLE SHAFT WITHIN A GAS TURBINE ENGINE

[75] Inventor: Keven G. Van Duyn, Bloomfield, Conn.

[73] Assignee: United Technologies Corporation, Hartford, Conn.

[21] Appl. No.: 09/218,874

[22] Filed: Dec. 22, 1998

[51] Int. Cl.⁷ .................................................. F01D 25/00
[52] U.S. Cl. ...................... 415/9; 415/173.4; 415/174.4; 415/229
[58] Field of Search .................. 415/9, 170.1, 173.4, 415/174.4, 200, 229, 230; 60/39.091, 226, 223, 39.75; 384/624

[56] References Cited

U.S. PATENT DOCUMENTS

| | | | |
|---|---|---|---|
| 4,193,741 | 3/1980 | Briggs | 416/170 R |
| 4,201,513 | 5/1980 | Sales | 416/2 |
| 5,791,789 | 8/1998 | Van Duyn et al. | 384/624 |

*Primary Examiner*—Edward K. Look
*Assistant Examiner*—James M. McAleenan
*Attorney, Agent, or Firm*—Monica G. Krasinski

[57] ABSTRACT

An apparatus for supporting a rotatable shaft within a gas turbine engine during a high rotor imbalance condition includes a first bearing and a fixed support frame. One of the support frame or shaft includes a one-piece flange that has a first portion, a second portion and a failure region with a predetermined load capacity, which connects the first and second portion together. The bearing is radially disposed between the rotatable shaft and the fixed support frame, and is supported by the second portion of the flange. The bearing provides a load path between the fixed support frame and the rotatable shaft until a high rotor imbalance condition when the failure region fails in response to the application of loads that exceed the load capacity of the failure region. The failure of the failure region then provides for the separation of the first portion of the flange from the second portion and the elimination of the load path through the bearing.

15 Claims, 5 Drawing Sheets

METHOD AND APPARATUS FOR SUPPORTING A ROTATABLE SHAFT WITHIN A GAS TURBINE ENGINE

TECHNICAL FIELD

This invention relates to gas turbine engines, and more particularly to an apparatus for supporting a rotatable shaft subject to a load imbalance.

BACKGROUND ART

Gas turbine engine rotors include a plurality of blades attached to a disk for rotation around the rotational axis of the engine. The disks are attached to a shaft sometimes referred to as "spool". Most modern gas turbine engines include a high-speed shaft and a low speed shaft. The forward end of the low speed shaft is connected to the fan and low-speed compressor and the other end is attached to the low-speed turbine. The forward end of the high-speed shaft is connected to the high-speed compressor and the other end is attached to the high-speed turbine. The shafts are substantially concentric and both are centered on the rotational axis of the engine. Bearings disposed between the shafts and the fixed frame of the engine provide load paths therebetween. The center of gravity of each rotor is designed to coincide with the rotational axis of the engine for load symmetry purposes. Each rotor also has a natural vibratory frequency which, by design, is higher than the rotor's maximum rotational frequency.

To ensure maximum safety, it is common practice to design shafts and accompanying hardware to accommodate possible, but unlikely, shaft loadings. One scenario that must be considered is the partial or complete liberation of a rotor blade. In the event a rotor blade partially or completely liberates from a disk, the rotor will experience an imbalance load that can change the rotor's center of gravity, displacing it from the rotational axis of the engine. Since the bearings constrain the rotor radially, the misalignment between the rotor's center of gravity and the axis of the engine results in the imbalance load being transmitted through the bearings to the support frame. To avoid or minimize support frame damage, it is common practice to make the support frame strong enough to withstand the imbalance load until the engine can be safely shut down. Unfortunately, a support frame strong enough to withstand the largest possible imbalance load is often impractically heavy, particularly with the large fan diameters of today's high bypass gas turbine engines.

An alternative approach to accommodating a rotor imbalance load is to support a bearing with a bolted flange arrangement. If the imbalance load exceeds a predetermined limit, the bolts shear thereby preventing the imbalance load from traveling through the bearing to the support frame. A problem with this approach is that the failed bolts can be liberated and sent aft into the engine where they themselves can cause foreign object damage.

Another approach for accommodating a rotor imbalance load is to use a bearing support designed to buckle when subjected to an imbalance load greater than a predetermined limit. One potential drawback of this approach is the difficulty of analytically predicting when the support will buckle given the variety of load scenarios that may occur. The analytical predictions often must be substantiated through extensive, expensive empirical testing. Another potential drawback is that "buckling" bearing supports typically require tight manufacturing tolerances and strict material properties, both of which add to the cost of the support.

What is needed, therefore, is an apparatus and/or a method for supporting a rotatable shaft within a gas turbine engine that can accommodate an imbalance load, one that does not create foreign object damage, one that is readily manufacturable, and one that is cost-effective.

DISCLOSURE OF THE INVENTION

It is, therefore, an object of the present invention to provide a method and apparatus for supporting a rotatable shaft within a gas turbine engine capable of accommodating an imbalance load.

Another object of the present invention is to provide a method and apparatus for supporting a rotatable shaft within a gas turbine engine that attenuates severe rotor oscillations occurring immediately after the onset of a rotor imbalance condition.

Another object of the present invention is to provide a method and apparatus for supporting a rotatable shaft within a gas turbine engine subject to an imbalance load while the engine is initially under power and subsequently while the engine is in a power-off state.

According to one aspect of the present invention, an apparatus for supporting a rotatable shaft within a gas turbine engine includes a bearing and a fixed support frame. One of the support frame or shaft includes a one-piece flange that has a first portion, a second portion, and a failure region disposed between the first and second portions. The failure region has a predetermined load capacity. The bearing is radially disposed between the rotatable shaft and the fixed support frame. Under normal operating conditions, the bearing provides a load path between the fixed support frame and the rotatable shaft by way of the second portion of the flange. In the event the shaft is subjected to an imbalance load in excess of the predetermined limit, the failure region fails thereby separating the second portion and eliminating the load path through the bearing.

According to another aspect of the present invention, a method for supporting a rotatable shaft within a gas turbine engine subject to an imbalance load is provided. One step of the method includes providing a one-piece flange attached to one of the fixed support frame or the rotatable shaft. The flange includes a first portion, a second portion, and a failure region with a predetermined load capacity connecting the first and second portions. Another step of the method includes providing a first bearing radially disposed between the rotatable shaft and the fixed support frame, wherein the second portion of the flange supports the first bearing. The first bearing provides a first load path between the fixed support frame and the rotatable shaft. Another step of the method includes providing a second bearing radially disposed between the rotatable shaft and the fixed support frame. The second bearing provides a second load path between the fixed support frame and the rotatable shaft. Another step of the present invention includes releasing the first bearing in response to an imbalance load condition where the imbalance load exceeds the load capacity of the failure region. The first bearing is released when the failure region fails and the second portion of the flange separates from the flange. A final step of the present invention includes supporting the rotatable shaft during a transient period and a subsequent second steady-state period through said second load path between the support frame and the rotatable shaft by way of the second bearing.

An advantage of the present invention is that a method and apparatus for supporting a rotatable shaft within a gas turbine engine is provided which is capable of accommodating an imbalance load initially while the engine is under power and subsequently when the engine is not powered, but is subjected to in-flight free stream air.

Another advantage of the present invention is the weight savings attributable to isolating the support frame from potentially damaging oscillatory forces exerted by the unbalanced rotor.

Another advantage of the present invention is that the apparatus for supporting the rotatable shaft can be installed easily and in a cost-efficient manner. The failure region is weakened by mechanisms such as notches or grooves, serrations or the use of weakened material, all of which do not require tight manufacturing tolerances which translates to a cost-effective manufacturing process. In addition, the failure region is positioned relatively close to the bearing which is released when the imbalance loads exceed a predetermined level, which makes it easy to analytically predict when the support will fail given the variety of load scenarios. Thus, no extensive, expensive empirical testing is required to substantiate the analytical models used to predict the imbalance load level required to make the present invention effective.

Another advantage of the present invention is that it minimizes the possibility of foreign object damage emanating from a frangible bearing support. Specifically, in the event the failure region of the flange fails, the second portion of the flange will separate as a ring. The second portion ring, and possibly a bearing race, are easily constrained because of their annular shape, consequently avoiding foreign object damage within the engine.

The foregoing features and advantages and the operation of the invention will become more apparent in light of the following description of the best mode for carrying out the invention and the accompanying drawings.

BEST MODE FOR CARRYING OUT THE INVENTION

Figure 1:
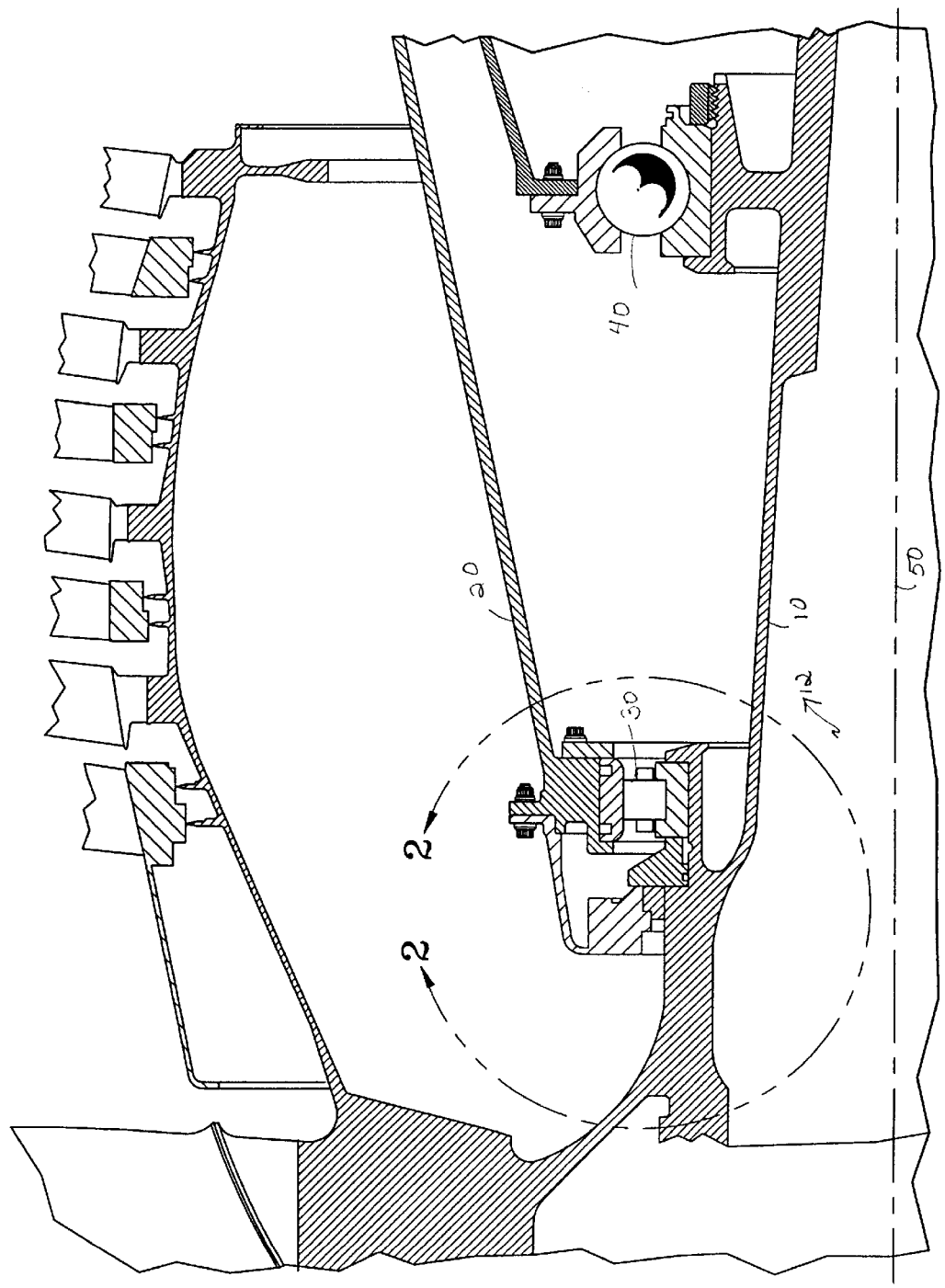
FIG. 1 is a cross-sectional view of a gas turbine engine rotor support arrangement of the present invention.

Referring to FIG. 1, an aircraft gas turbine engine includes a shaft 10, a rotor 12, a fixed support frame 20, a first bearing 30, and a second bearing 40. The rotor 12 includes a plurality of blades extending radially out from a disk. The rotor 12 is fixed to the shaft 10, and the shaft is rotatably supported on the fixed support frame 20 by the first 30 and second bearings 40. The shaft, which is rotatable about a longitudinally extending central axis 50, connects the fan and low speed compressor to the low speed turbine.

Figure 2:
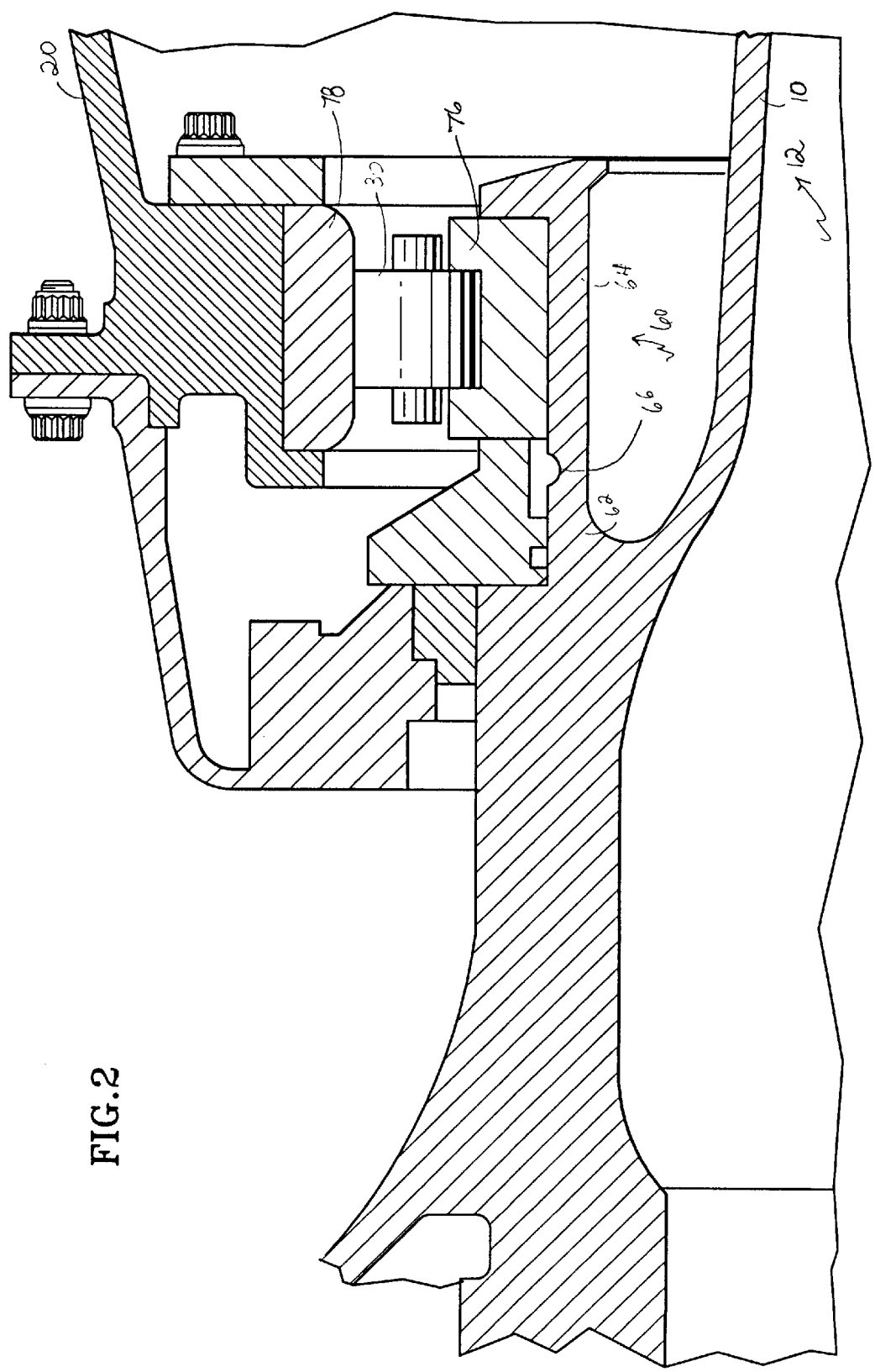
FIG. 2 is an enlarged view of the circled area 2—2 shown in FIG. 1, including the failure region for the flange having a notch or groove disposed therein.
Figure 3:
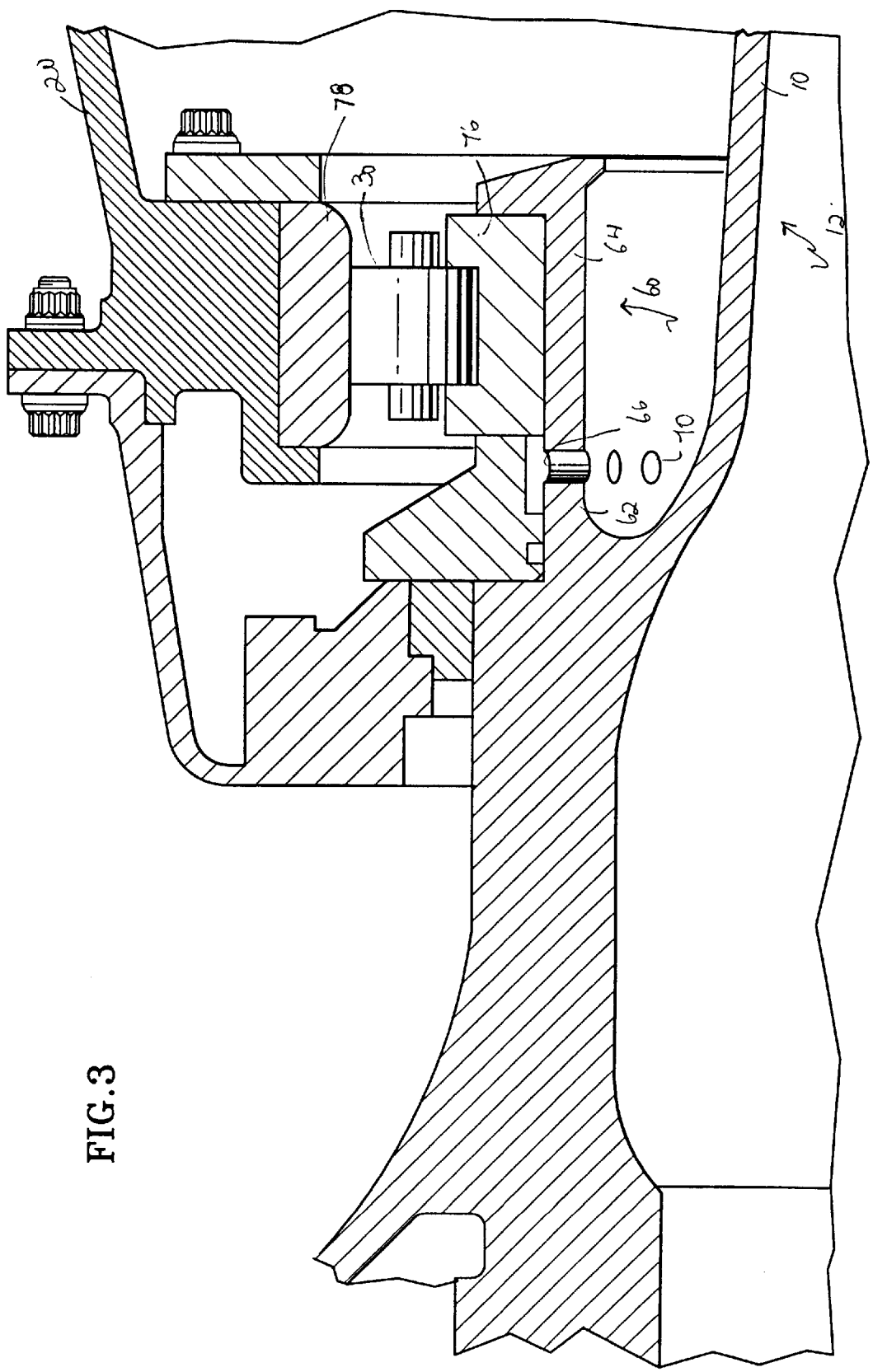
FIG. 3 is a view similar to FIG. 2 showing an alternative embodiment of the present invention including the failure region for the flange having a plurality of holes drilled circumferentially in the failure region.
Figure 4:
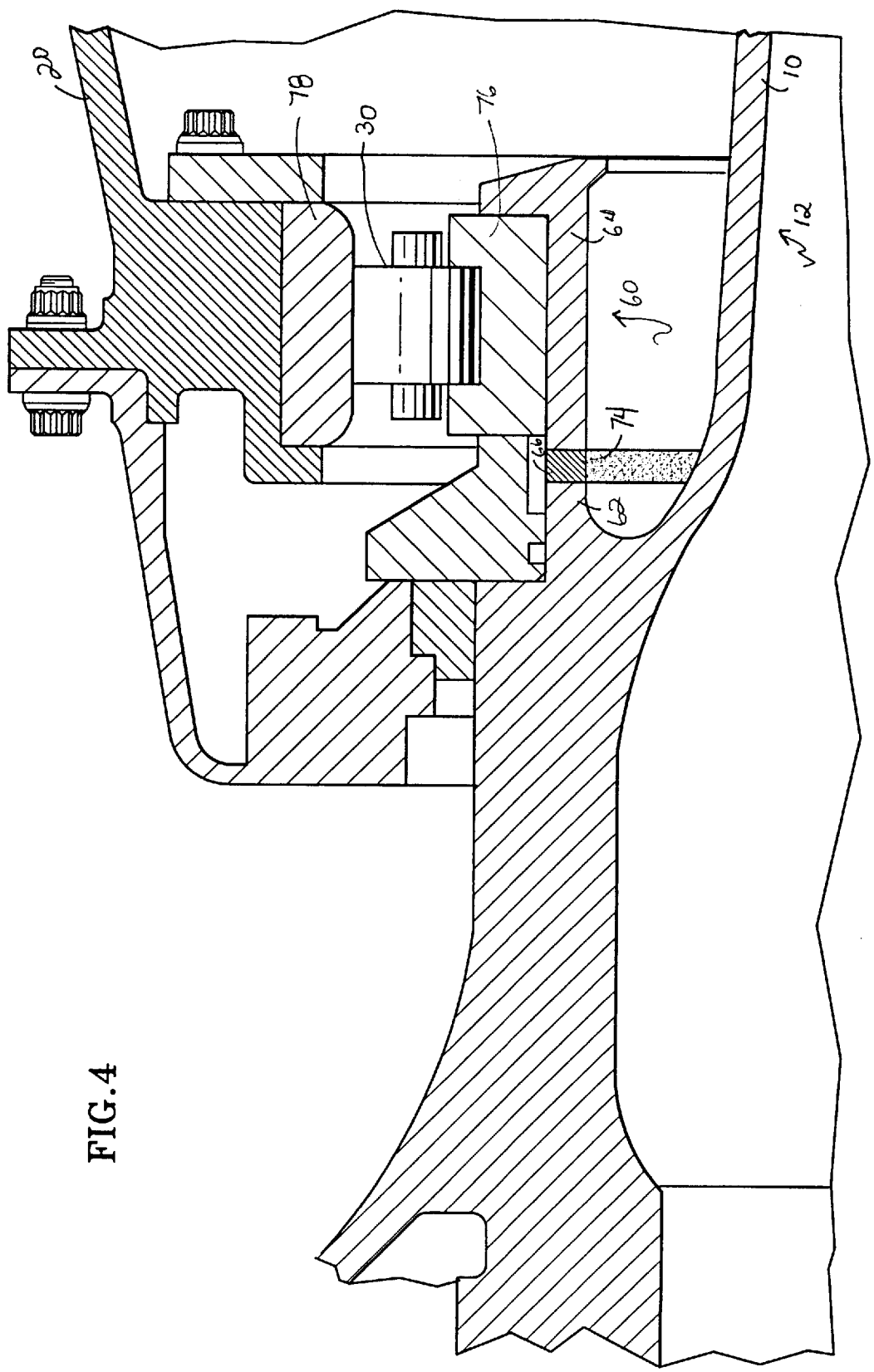
FIG. 4 is a view similar to FIG. 2, including the failure region having weakened material disposed therein.

Referring to FIG. 2, an exemplary embodiment of the present invention includes a shaft 10 having a one-piece flange 60 which has a first portion 62, a second portion 64, and a failure region 66 disposed between the first and second portions. The failure region 66 has a predetermined load capacity. The first bearing is radially disposed between the rotatable shaft 10 and the fixed support frame 20. The second portion 64 of the flange 60 supports the bearing 30. The first bearing 30 provides a load path between the fixed support frame 20 and the rotatable shaft 10. In the preferred embodiment, the failure region includes a circumferentially extending notch which introduces a stress concentration factor into the failure region 66 of sufficient magnitude such that a load of predetermined magnitude will cause the failure region to fail. In alternative embodiments, such as illustrated in FIG. 3, the failure region 66 could include a plurality of notches, a plurality of circumferentially spaced notches, a plurality of holes 70, or other geometric features known to cause a significant stress concentration factor. In another alternative embodiment, as illustrated in FIG. 4, the failure region includes a material 74 with a lower mechanical strength than either the first or second portion. The exact mechanical strength is chosen to reflect the predetermined load capacity such that the failure region 66 will fail by shear, for example, when exposed to the predetermined load. The mechanical strength of material 74 within the failure region 66 can also be adjusted to a desirable strength level by processes such as heat treatment, welding, or surface finish. The bearing 30 includes an inner race 76 and an outer race 78. In some applications, one of the inner or outer race may be attached to the second portion of the flange by press-fit.

Figure 5:
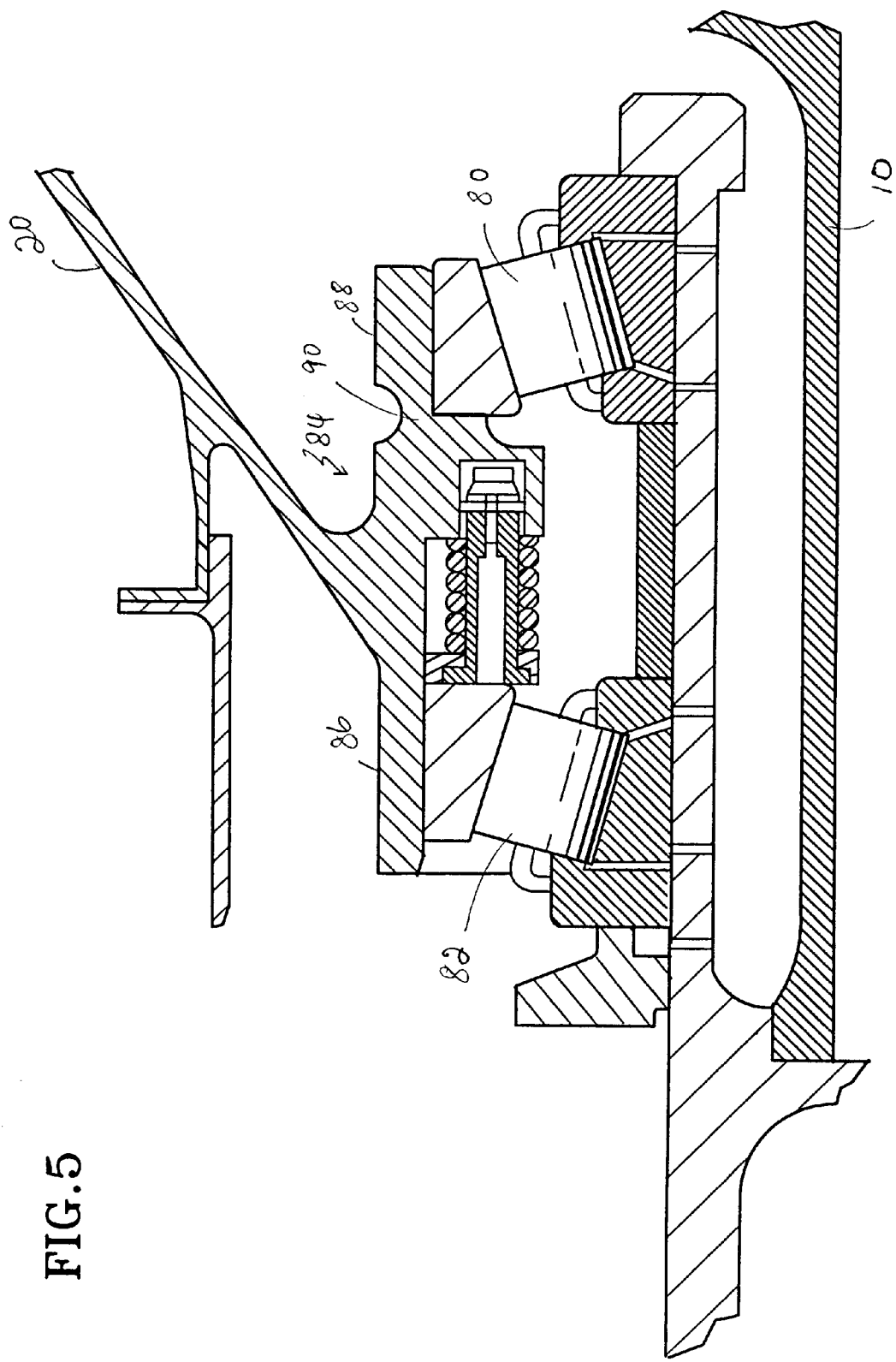
FIG. 5 is a cross-sectional view of another embodiment of the rotor support arrangement of the present invention.

Referring to FIG. 5, another exemplary embodiment of the present invention includes a first bearing 80 and a second bearing 82 supported by a one-piece flange 84, similar to that described above, which is a part of the fixed support frame 20. The first portion 86 of the flange 84 supports the second bearing 82 and the second portion 88 of the flange 84 supports the first bearing 80. A failure region 90 is disposed between the first portion 86 and second portion 88 of the flange. The bearings 80, 82 provide load paths between the fixed support frame 20 and the rotatable shaft 10.

During normal engine operation, the rotor's center of gravity substantially coincides with the central axis of the engine and the bearings constrain the shaft and rotor to rotate around the axis. For purposes of this disclosure, normal engine operation may be considered as a first steady-state condition.

In the event a rotor blade partially or completely liberates from a disk, the rotor's center of gravity will likely change resulting in a misalignment between the rotor center of gravity and the rotational axis of the engine. Since the bearings constrain the rotor radially, the misalignment between the rotor's center of gravity and the axis of the engine results in an imbalance load being transmitted through the bearings to the support frame. Depending upon the nature of the failure, the initial imbalance load may be great enough to reach the predetermined load capacity of the failure region of the flange. In other instances, the frequency response of the mechanical system may coincide with a forcing function associated with the imbalance load. In that case, the magnitude of the imbalance load is likely to increase per revolution and begin approaching a resonant condition. Before resonance is reached, however, the magnitude of the imbalance load, now amplified, will reach the predetermined load capacity of the failure region.

Once the predetermined load capacity is reached, the failure region will fail and liberate the second portion of the flange, and perhaps a bearing race in those instances where the bearing race is press fit onto the flange and not restrained by any clip or the like. The second portion of the flange and bearing race separate as rings. Separating the second portion of the flange eliminates the load path through the bearing, and consequently minimizes the transmission of imbalance forces to the support frame in the region of the bearing. After the failure region has failed in response to the imbalance force, the power is cut to the engine and the rotational speed of the engine decreases. As the rotational speed decreases so too does the imbalance load. After a period of time the rotor and shaft will no longer be rotating because of power. In fact in a land-based gas turbine application, the engine will eventually come to a stop. In an aircraft gas turbine application, however, air passing into the engine will cause the rotors to continue rotating (sometimes referred to as "windmilling"). For purposes of this disclosure, the period of time between when the imbalance load originates and when the engine is windmilling is referred to as the transient phase, and the "windmilling" condition may be considered a second steady-state condition.

After the load path through the first bearing is eliminated, a portion of the load formally traveling through the first bearing subsequently transfers to the load path traveling through the second bearing. FIG. 1 shows an embodiment where the second bearing 40 is a ball-type bearing capable of handling some degree of radial load misalignment. FIG. 5 shows an embodiment where the second bearing 82 is a tapered roller-type bearing that is capable of handling both a radial load and an axial thrust load. The exact type of second bearing used will depend on the application and the type of loading expected. In all cases, however, the second bearing provides a load path between the support frame and the shaft after the load path through the first bearing has been eliminated, and is capable of enduring the load during the initial transient phase and the subsequent second steady-state condition.

Although the invention has been shown and described with respect to detailed embodiments thereof, it should be understood by those skilled in the art that various changes in form and detail thereof may be made without departing from the spirit and the scope of the claimed invention. For example, the locations of the frangible bearing support and the durable bearing support may be reversed. Further, even though the best mode of the present invention has been described as providing a support for a rotatable shaft connected to a fan, the present invention has applicability for use in any other rotor stage of an engine.

What is claimed is:

1. An apparatus for supporting a rotatable shaft within a gas turbine engine, said apparatus comprising:
    a first bearing; and
    a fixed support frame which includes a one-piece flange, said flange having a first portion, a second portion, and a failure region with a predetermined load capacity connecting said first portion and said second portion;
    wherein said first bearing is radially disposed between the rotatable shaft and said fixed support frame, and said second portion of said flange supports said first bearing;
    wherein said first bearing provides a load path between said fixed support frame and the rotatable shaft;
    wherein exceeding said load capacity of said failure region causes said failure region to fail and the separation of said first portion from said second portion.

2. An apparatus according to claim 1, further comprising:
    a second bearing, radially disposed between the rotatable shaft and said fixed support frame, said second bearing providing a load path between said fixed support frame and the rotatable shaft during an imbalance condition and in a subsequent power-off engine state.

3. The apparatus according to claim 1, wherein the failure region includes at least one notch.

4. The apparatus according to claim 3, wherein said at least one notch extends circumferentially.

5. The apparatus according to claim 1, wherein the failure region includes a material having a lower mechanical strength than said first or second portion.

6. The apparatus according to claim 5, wherein said material has been weakened by the process of heat treatment.

7. The apparatus according to claim 5, wherein said material has been weakened by the process of welding.

8. A method for supporting a rotatable shaft within a gas turbine engine, when said shaft is subjected to an imbalance load condition, comprising the steps of:
    (a) providing a one-piece flange, said flange attached to a fixed support frame, said flange having a first portion, a second portion, and a failure region with a predetermined load capacity connecting said first and said second portion;
    (b) providing a first bearing radially disposed between the rotatable shaft and said fixed support frame, wherein said second portion of said flange supports said first bearing, and said first bearing provides a first load path between said fixed support frame and the rotatable shaft;
    (c) providing a second bearing radially disposed between the rotatable shaft and said fixed support frame, and said second bearing provides a second load path between said fixed support frame and the rotatable shaft;
    (d) releasing said first bearing in response to an imbalance load condition where said imbalance load exceeds said load capacity of said failure region, thereby causing said failure region to fail and the separation of said first portion from said second portion wherein the first bearing is released; and
    (e) supporting said rotatable shaft during a transient period and a subsequent second steady-state period through said second load path between said support frame and the rotatable shaft by way of said second bearing.

9. An apparatus for supporting a rotatable shaft within a gas turbine engine, said apparatus comprising:
    a first bearing;
    a fixed support frame; and
    a one-piece flange attached to said shaft, said flange having a first portion, a second portion, and a failure region with a predetermined load capacity connecting said first portion and said second portion;
    wherein said first bearing is radially disposed between the rotatable shaft and said fixed support frame, and said second portion of said flange directly supports said first bearing;
    wherein said first bearing provides a load path between said fixed support frame and the rotatable shaft;
    wherein exceeding said load capacity of said failure region causes said failure region to fail and the separation of said first portion from said second portion.

10. An apparatus according to claim 9, further comprising:
    a second bearing, radially disposed between the rotatable shaft and said fixed support frame, said second bearing providing a load path between said fixed support frame and the rotatable shaft during an imbalance condition and in a subsequent power-off engine state.

11. The apparatus according to claim 9, wherein the failure region includes at least one notch.

12. The apparatus according to claim 11, wherein said at least one notch extends circumferentially.

13. The apparatus according to claim 9, wherein the failure region includes a material having a lower mechanical strength than said first or second portion.

14. The apparatus according to claim 13, wherein said material has been weakened by the process of heat treatment.

15. The apparatus according to claim 13, wherein said material has been weakened by the process of welding.

* * * * *